Oct. 20, 1959 R. MARTY 2,909,616

MAGNETIC TALKING MACHINE

Filed June 10, 1954 2 Sheets-Sheet 1

INVENTOR
René MARTY
BY Mead, Browne, Schuyler & Beveridge
ATTORNEYS

INVENTOR
René MARTY
BY
Mead, Browne, Schuyler & Beveridge
ATTORNEYS

United States Patent Office 2,909,616

Patented Oct. 20, 1959

2,909,616

MAGNETIC TALKING MACHINE

René Marty, Paris, France

Application June 10, 1954, Serial No. 435,892

Claims priority, application France June 15, 1953

6 Claims. (Cl. 179—100.2)

It is a well known fact that in magnetic recording machines, the sound is altered when it is being read with respect to pitch, intensity and timbre, if the track, constituted e.g. of a wire, a strip or ribbon or else formed on or wound over a cylinder or disc or the like, moves at a speed different from that at which it has moved during the recording of the sound.

It is thus impossible in practice to obtain with such machines a proper reading of sound either at a reduced speed or else at a high forward speed. In this latter case moreover, the track is generally released so as to prevent any exaggerted wear of said track as well as of the magnetic head.

Furthermore, there occurs a rapid wear of the magnetic head during normal operation, chiefly in machines operating with a wire.

My invention has for its object to remove the above drawbacks and more particularly to maintain, exactly or at least within certain limits, the pitch of the sound during the reading, even if the track is unwound at a speed which is very different from normal speed, either at a higher speed or else on the contrary at a much lower speed.

To this end, I substitute, for the stationary head resorted to hitherto and in front of which the track advances, a multiple movable head the peripheral linear speed of which is permanently adjusted to a value such that the difference between said speed and the speed of progression of the track remains perfectly or at least substantially constant.

In a preferred embodiment of my invention, said head instead of being stationary and including a single gap is revoluble and is provided with two or more of these slots which are equally spaced, said head being driven by a mechanism constituted preferably by a differential gear and designed so as to make the relative speed of the gaps with reference to the track assume a constant value equal and opposed to the normal speed of track progression. Thus, the gaps are constrained to rotate at said normal speed, but in the opposite direction, when the track is at a standstill. In contradistinction, they revolve in the direction of the track but at a lesser speed, the speed of slip being equal to said normal speed, when the track advances forwardly at a high speed.

Further objects and features of my invention will appear in the reading of the following description, reference being made to the accompanying drawings illustrating, by way of example and by no means in a limiting sense, various embodiments of my invention. In said drawings:

Fig. 1 is an elevational sectional view of a magnetic head according to my invention.

Figs. 2*a* and 2*b* are respectively a cross-sectional elevational view and a plan view of a modification of said head.

Fig. 2*c* is a corresponding cross-section through the axis thereof.

In the different figures, the size of the gaps has been considerably exaggerated for the purposes of illustration, but in practice said gaps should have standard usual sizes, i.e. less than $\frac{1}{10}$ of a millimeter.

Figure 1:
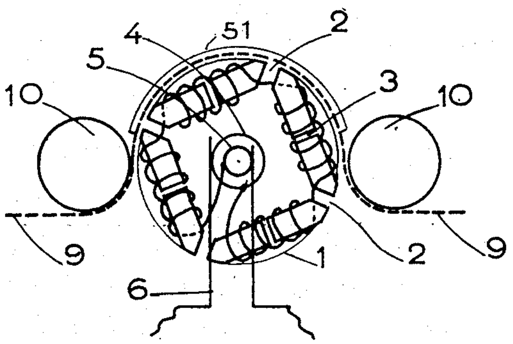

The magnetic head 1, which is polygonal or cylindrical, carries two or more slots or gaps 2 and said gaps, the number of which is four in the case illustrated in Fig. 1, are inserted in series in a magnetic circuit, provided if required with further gaps 3. The windings or coils are for instance connected in series so as to form two wires leading to the corresponding collecting rings 4 and 5 adapted to be engaged by brushes 6 or else these wires are connected with an input and an output arranged axially of the shaft at 7 and 8 in the case of the embodiment shown in Figs. 2*a*, 2*b* and 2*c*.

The track 9 is guided along an arcuate path inside a suitably shaped slideway or guideway 51 by rollers such as 10. When driven at a speed equal to normal recording speed, the machine operates as an ordinary machine including however one, two or more comparatively close reading points, somewhat after the manner of former two-needle talking machines. If the track is stopped and the head is caused to revolve round its axis in a manner such that the linear speed of its periphery is equal to the normal speed of progression of the track, the different components of sound retain their pitch and amplitude so that, when the track is at a standstill, the sound recorded within a narrow area of the track is transmitted in a continuous manner. For intermediate speeds, it is sufficient to impart to the track and to the slots of the head linear speeds of opposite directions, the algebraic difference between which is constant, while their absolute values are complementary, so that the sound may be restored during such periods of slow motion without any modification in the pitch, partial and total intensities and timbre.

When the track moves forwardly at a high speed, the gaps are shifted in the same direction as the track, but at a lesser speed, the difference in speed being always equal to the normal value of the speed of progression of the track.

Figures 3, 4:
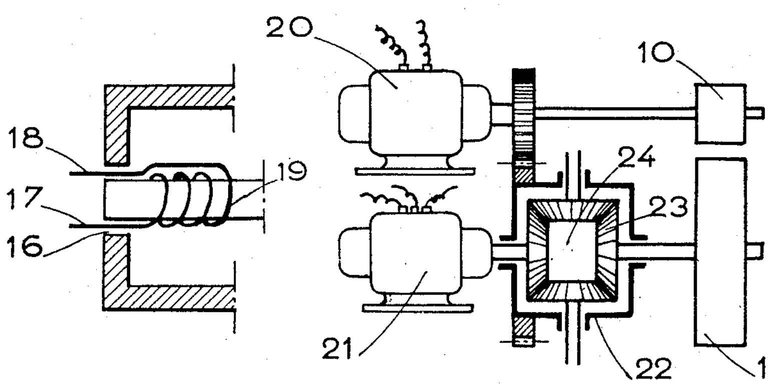
Fig. 3 is a cross-section through the axis of a further embodiment.
Figs. 4 and 5 are side views of differential gears adapted for incorporation with the above embodiments.

These results may be achieved for instance by means of two motors of which one drives the track at a speed which may be adjusted as desired, while the other the speed of which is suitably controlled by the speed of the first motor, controls the rotation of the head 1. The same results may also be obtained through the arrangements illustrated in Figs. 4 and 5. In Fig. 4, a motor 20 the speed of which is adjustable as required and which is associated possibly with a speed reducer, drives the track-engaging roller 10 while the second motor 21 rotating at a constant speed, also associated if required with a speed reducer, drives one of the three members forming the differential gear 24, in the example illustrated of the sun and planet type, of which a further member 22 is driven in unison with the track-engaging roller by the first motor 20, said further member 22 forming in the case of Fig. 4 the planet carrier of the differential gear.

The speed obtained for the third member 23 of the differential gear is such, if the members of the sun and planet gear or equivalent arrangement are suitably selected, that it corresponds to the desired speed of rotation of the magnetic head driven by said third member.

Thus, when the track is at a standstill, the motor 21 will revolve in a direction opposed to the direction of rotation of the head 1 and at the same speed, said speed being such that the linear peripheral speed of said head 1 is equal in absolute value to the normal speed of progression of the track while its direction is opposed to that of the latter. Now, if the motor 20 is caused to revolve so as to drive the gear 22 at a speed equal to half the speed of the motor 21, the head 1 will be stationary. The gears forming part of the differential gear and the diameter of the roller 10 engaging the track are designed in a manner such that the linear peripheral speed of the roller 10 is then equal to normal speed of operation.

As the driving stresses are small, the complete differential gear may as well be constituted by a mere roller bearing in which the openwork ring carrying the balls or rollers, and which may be made of bronze for instance, acts as one of the three parts of a differential gear while the two other parts are constituted by the two races associated with said ball bearing.

Figure 5:
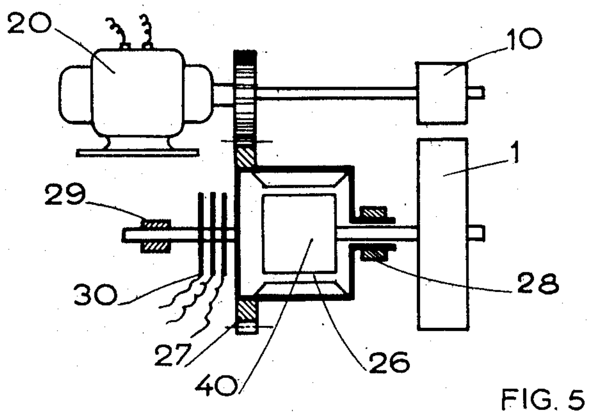

It may be of advantage to form the motor 21 and the differential gear 24 as a single unit constituted by a motor 26 as illustrated in Fig. 5 also revolving at a constant speed and associated if required with a speed reducer; the stator 27 of said motor 26 is carried by revoluble pivots 28 and 29; said motor is fed through the collecting rings 30 and the relative speed of its rotor 40 with reference to its stator is constant, so that said stator will act in the same manner as the gear 23 of the arrangement illustrated in Fig. 4 and produces the desired rotation of the head 1.

In this case when the rotor 20 and the track are at a standstill, the motor 26 drives the magnetic head 1 at a speed such that the peripheral speed of the latter is equal to the normal value of the speed of progression of the track but of an opposite direction.

Now if the motor 20 revolves so as to drive the stator 27 in a direction opposed to that of the progression of the motor 26 and at the same speed, the rotor 40 of the latter will come to a standstill together with the magnetic head 1. The gears and the diameter of the roller 10 are designed in a manner such that the peripheral speed of said roller 10 may then be equal to the above-mentioned normal speed of progression.

It is also possible to cut out the motor 20 while retaining the connection between the roller 10 and the stator 27 by providing suitable brakes, clutches and transmission means on the parts 10 and 1 and between them. If the magnetic head 1 is stopped, the stator revolves and drives the roller 10 and the track. If, on the contrary, the roller 10 is stopped and consequently also the stator 27, the head 1 revolves and produces sound during this stoppage of the track. The above mentioned transmission and clutches adapted to produce the desired connections as required between the magnetic head 1 and the roller 10 will impart to said head and roller intermediate speeds such that their algebraic sum is always equal to the speed of progression required for the sound track.

Figures 6, 7:
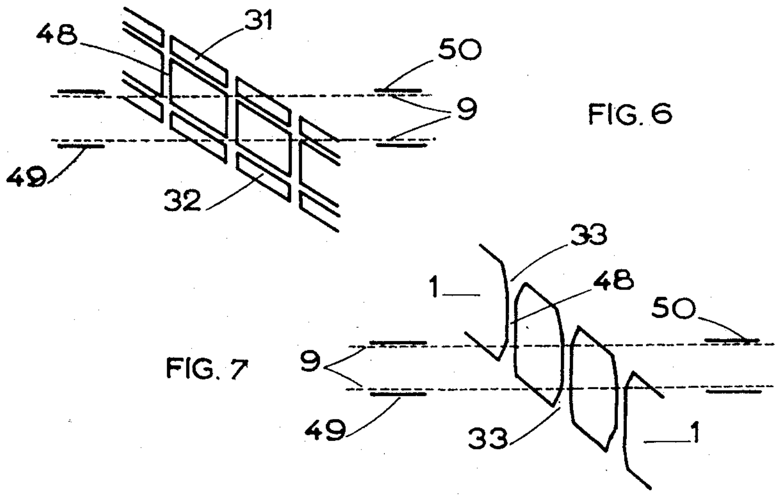
Figs. 6 and 7 are plan views of details of the gap.

A difficulty appears sometimes in the operation of the above described arrangement. As a matter of fact, the operation of a gap should begin gradually so as to cut out all parastical noises. Now, it may ocur that the mere engagement of the track by the periphery of the slot is too sudden. The arrangements of Figs. 6 and 7 disclosed with reference to Figs. 1 to 5 have for their object to maintain more reliably the desired gradual starting of operation. To this end and as illustrated in Fig. 6, the head 1 is provided with oblique slots or gaps 48 arranged helically and it may be arranged so as to slope by a same angle with reference to the guideways 49 and 50 followed by the track so that said track may be normal to the gaps, although this is not essential. In order to avoid any disturbance along the edges, the magnetic head may extend to either side and include lateral pulses 31—32 which are also of a magnetic material but carry no winding, or again the slots 48 may be wider than the track and their ends 33 may be slightly flaring as shown in Fig. 7.

Now, if the different sections of the head perpendicular to the axis of rotation are considered, each section acts only on a corresponding fraction of the flux and the phenomena are slightly shifted in time between the successive sections.

Figure 2A:
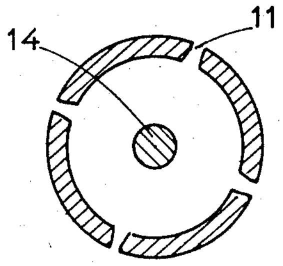
Figure 2C:
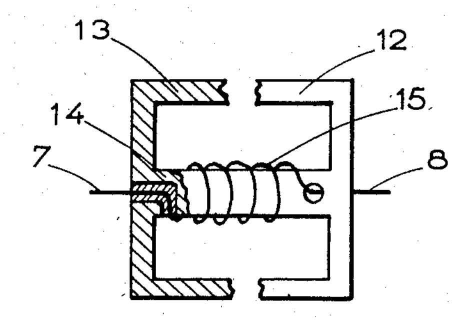
Figure 2B:
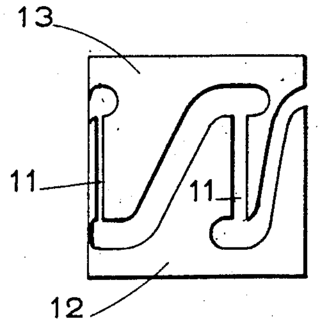

In the arrangement illustrated in Fig. 1, the brushes 6 may be fed with current through a commutator connected with the convolutions of the winding. In Figs. 2*a*, 2*b*, 2*c*, the slots 11 define only two separate parts 12 and 13 and said slots form a parallel instead of a series arrangement in the magnetic circuit which closes over the core 14. One or more windings 15 surround the core or the like parts of revolution. Instead of revolving with the whole arrangement, the winding may be stationary as illustrated in Fig. 3 at 19 and consequently the magnetic circuit is provided with an axial opening or gap 16 through which the feeding wires 17 and 18 are caused to pass together with the member carrying the coil 19.

The core may also be secured through the agency of a rotary joint inside each end of the magnetic circuit. This arrangement has not been illustrated.

Figure 8:
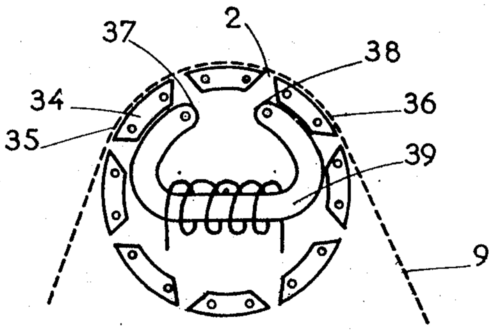
Fig. 8 is an elevational sectional view of a further modification of the head.

Fig. 8 illustrates a preferred embodiment. In said figure, the arrangement includes a stationary coil wound over a magnetic circuit one part of which is stationary and the other is movable. The movable part of the magnetic circuit is provided with a series of gaps 2 and of magnetic sections 34 separated by the latter and carried by an endless rigid or yielding strip or by a cylinder or frustocone engaging the track, whether oblique or otherwise, extending over the arc 35—36.

The desired gradual engagement and disengagement of the slot 2 with reference to its operative position, instead of being obtained in the manner shown in Figs. 6 or 7 is obtained, the track remaining in contact with said slot, by the relative movement of the adjacent magnetic section 34 with reference to one of the tips 37 and 38 of a pole piece of the stationary part 39 of the magnetic circuit.

Said pole pieces may surround three sides of the magnetic section 34 or else engage solely its inner surface as illustrated.

Said arrangement allows an increase of the number of slots or gaps, an angular reduction of the contacting arc of the track, a reduction of the wear which is all the more efficient since the latter is distributed between a multiplicity of miniature interchangeable heads.

During rapid forward movement and by reason of the presence of the differential gear, the speed at which the track slips with reference to the gaps remains equal to normal, which cuts out any excessive wear and also snatches of words, although utered at a high speed, may be caught, because they remain at their original pitch and do not reach inaudible frequencies.

It is a well known fact that in conventional machines, the speed at which the track is driven cannot be modified by more than a few thousandths if no whining impression is to be produced, and for this reason it is customary in practice to resort to a number of driving motors.

Now, with the arrangement according to my invention, a single spool-driving motor is sufficient without it being necessary to resort to a further track-driving motor, in spite of the modification in the radius of the spool during the rewinding thereof. A projection engaging the wound part of the strip and acting on electric switches or the like means is sufficient for adjusting the speed of the motor according to the amount of winding as well at normal speed, at reduced speed and at high speed. It has been assumed hitherto that during recording procedure, the track progresses at normal speed. It is also possible, with a view to using the same machine for other purposes such as a telephonic transmission for instance, to make the track progress at different speeds, whether higher or lower or even at a variable speed. The recorded sound will then correspond to such modified rhythms, but without any change in the pitch, intensity and timbre.

The sound may thus be recorded at a reduced speed or else at a high speed and be used at corresponding speeds on ordinary machines or else on machines adapted, according to the invention, to restore or even modify again the rhythm.

Furthermore, in another branch of industry, that of optical recording, there exist apparatuses which also produce sound at a reduced speed by resorting to differential mechanisms. Now, certain machines such as synchronizing or mixing machines and the like serve for making the magnetic records register with other records such as pictures, sound tracks, photographic tracks and the like.

My invention is applicable to such machines so as to provide them with the advantages disclosed. To this end, it is possible to associate the above described system with the optic systems, which reduce the speed of the sound, this association leading in particular to the use of the same differential and the like driving gears, which latter then control simultaneously on one hand the magnetic head and the optic distributor and on the other hand the various tracks.

It is thus possible to greatly simplify the arrangement and to obtain a better appearance of the latter.

Obviously, various modifications may be brought to the different devices disclosed without unduly widening thereby the scope of the present invention as defined in the accompanying claims.

What I claim is:

1. In a magnetic talking machine in which a magnetic track is guided along an arcuate path, a rotatable head provided with a plurality of equidistant reading slots, means adapted to make said head rotate coaxially with the arcuate path to shift the slots along said arcuate path, a stationary coil housed inside said head, a magnetic core carrying said coil and the tips of which extend into proximity with the inner surface of the magnetic head, and means controlling the progression of the track in the arcuate path in register with the head at a relative predetermined speed with reference to the head which is always equal to the said predetermined speed.

2. In a magnetic talking machine in which a magnetic track is guided along an arcuate path, a rotatable head provided with a plurality of equidistant reading slots, means adapted to make said head rotate coaxially with the arcuate path to shift the slots along said arcuate path, a stationary coil housed inside said head, a magnetic core carrying said coil and the tips of which extend into proximity with the inner surface of the magnetic head, means controlling the progression of the track in the arcuate path in register with the head, means controlled by last mentioned means and adapted to act on the first mentioned means to make the head revolve at a speed such that the algebraic difference between the progression of the track in front of the head and the peripheral speed of the head assumes throughout the operation a constant value which is equal to a predetermined sped of reading.

3. In a magnetic talking machine in which a magnetic track is guided along an arcuate path, a rotatable head provided with a plurality of equidistant reading slots, means adapted to make said head rotate coaxially with the arcuate path to shift the slots along said arcuate path, a stationary coil housed inside said head, a magnetic core carrying said coil and the tips of which extend into proximity with the inner surface of the magnetic head, the distance separating said tips being substantially equal to the distance separating two successive slots in the head, and means controlling the progression of the track in the arcuate path in register with the head at a relative predetermined speed with reference to the head which is always equal to the said predetermined speed.

4. In a magnetic talking machine in which a magnetic track is guided along an arcuate path, a rotatable head provided with a plurality of equidistant reading slots, said slots forming a continuous zig-zag shaped separating line across the periphery of the head, means adapted to make said head rotate coaxially with the arcuate path to shift the slots along said guideway, a stationary magnetic core housed inside said head, the tips of which core extend into proximity with the inner surface of the magnetic head, a magnetizing coil carried by said core, means controlling the progression of the track in the arcuate path in register with the head, means controlled by last-mentioned means and adapted to act on the first mentioned means to make the head revolve at a speed such that the algebraic difference between the progression of the track in front of the head and the peripheral speed of the head assumes throughout operation a constant value which is equal to a predetermined speed of reading.

5. In a magnetic talking machine, the combination of an arcuate guideway in which a magnetic track is adapted to move, a rotatable head provided with a plurality of equidistant reading slots registering with the guideway, a stationary magnetic core housed inside said head, the tips of which core extend into proximity with the inner surface of the magnetic head, a magnetizing coil carried by said core, a motor adapted to make the track progress at a variable speed inside its guideway, a second motor including a rotor positively controlling the revoluble head to shift the slots along the guideway and a revoluble stator and a gearing interconnecting the first motor with said stator to constrain the later to revolve at a speed such that the rotor revolves in a direction such and at a speed such that the peripheral speed of the magnetic head is always algebraically equal to the actual speed of the track minus its normal speed of operation.

6. In a magnetic talking machine, the combination of means defining an arcuate path along which a magnetic track is adapted to move, a revoluble head provided with a plurality of equidistant reading slots, means adapted to make said head rotate coaxially with the arcuate path to shift the slots along said arcuate path, a stationary coil, a magnetic core carrying said coil and the tips of which extend into proximity with the inner surface of the magnetic head, and means controlling the progression of the track in the arcuate path in register with the head at a relative predetermined speed with reference to the head which is always equal to the said predetermined speed.

References Cited in the file of this patent

UNITED STATES PATENTS

| | | |
|---|---|---|
| 2,352,023 | Schuller | June 20, 1944 |
| 2,539,837 | Howell | Jan. 30, 1951 |
| 2,648,589 | Hickman | Aug. 11, 1953 |
| 2,656,419 | Dingley | Oct. 20, 1953 |
| 2,743,318 | De Forest | Apr. 24, 1956 |